(No Model.)  6 Sheets—Sheet 1.

L. D. SHAW.
COMBINED WATER TOWER AND FIRE ESCAPE.

No. 348,297. Patented Aug. 31, 1886.

WITNESSES
W. J. Cambridge
Chas. E. Griffin

INVENTOR
Loring D. Shaw
per J. Teschemacher
Atty (No Model.) 6 Sheets—Sheet 2.
L. D. SHAW.
COMBINED WATER TOWER AND FIRE ESCAPE.

No. 348,297. Patented Aug. 31, 1886.

WITNESSES INVENTOR (No Model.) 6 Sheets—Sheet 3.
L. D. SHAW.
COMBINED WATER TOWER AND FIRE ESCAPE.
No. 348,297. Patented Aug. 31, 1886.
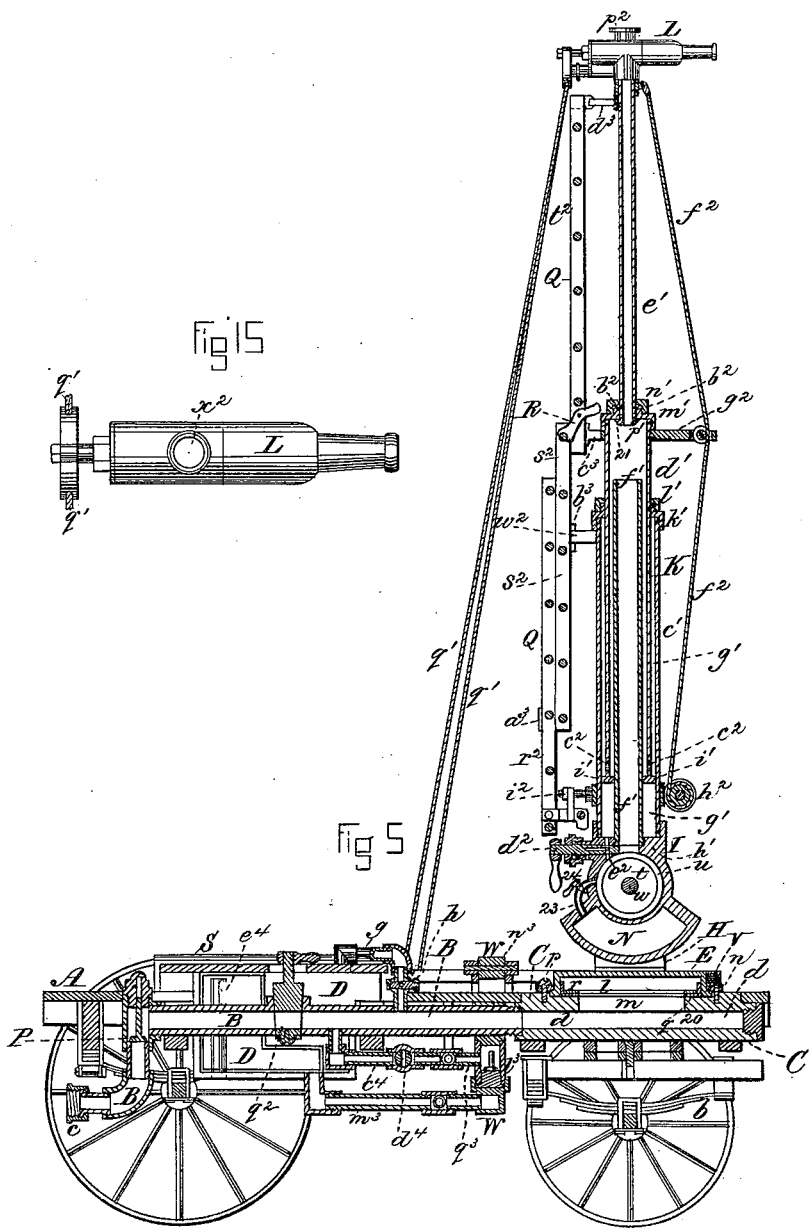
WITNESSES
INVENTOR (No Model.) 6 Sheets—Sheet 4.
L. D. SHAW.
COMBINED WATER TOWER AND FIRE ESCAPE.
No. 348,297. Patented Aug. 31, 1886.
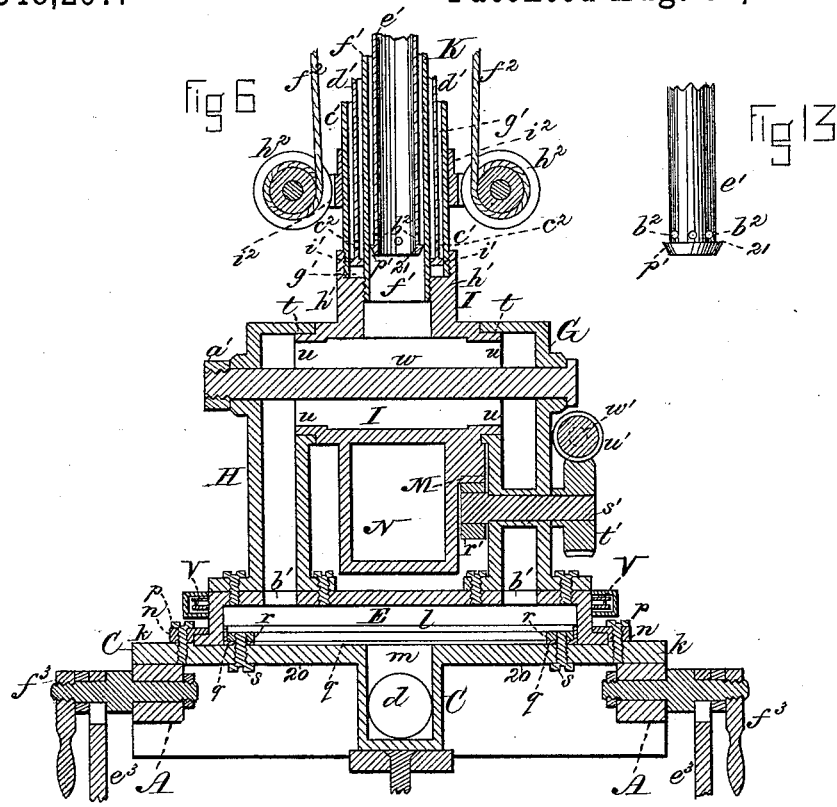
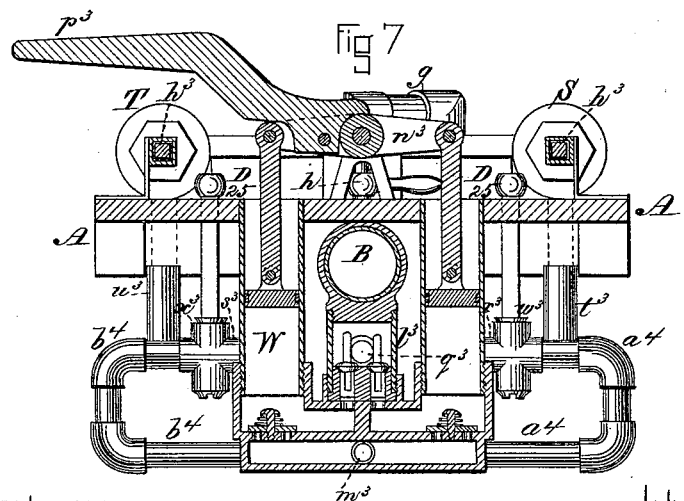
WITNESSES
INVENTOR (No Model.) 6 Sheets—Sheet 5.

L. D. SHAW.
COMBINED WATER TOWER AND FIRE ESCAPE.

No. 348,297. Patented Aug. 31, 1886.

WITNESSES
W. H. Cambridge
Chas. E. Griffin

INVENTOR
Loring D. Shaw
per R. Teschemacher
Atty (No Model.) 6 Sheets—Sheet 6.
L. D. SHAW.
COMBINED WATER TOWER AND FIRE ESCAPE.
No. 348,297. Patented Aug. 31, 1886.
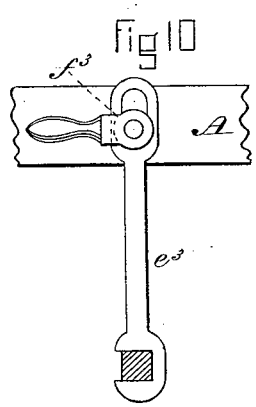
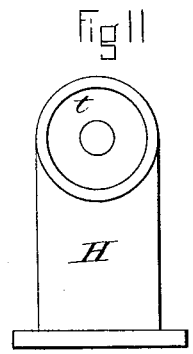
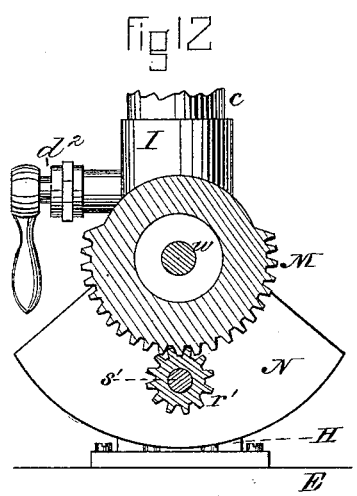
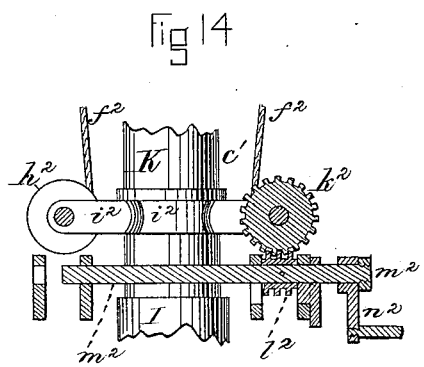

UNITED STATES PATENT OFFICE.

LORING D. SHAW, OF MELROSE, ASSIGNOR OF ONE-FOURTH TO EDWARD HOWARD, OF BOSTON, MASSACHUSETTS.

COMBINED WATER-TOWER AND FIRE-ESCAPE.

SPECIFICATION forming part of Letters Patent No. 348,297, dated August 31, 1886.

Application filed July 25, 1883. Serial No. 101,909. (No model.)

*To all whom it may concern:*

Be it known that I, LORING D. SHAW, a citizen of the United States, residing at Melrose, in the county of Middlesex and State of Massachusetts, have invented an Improved Combined Portable Water-Tower and Fire-Escape, of which the following is a full, clear, and exact description, reference being had to the accompanying drawings, making part of this specification, in which—

Figure 1:
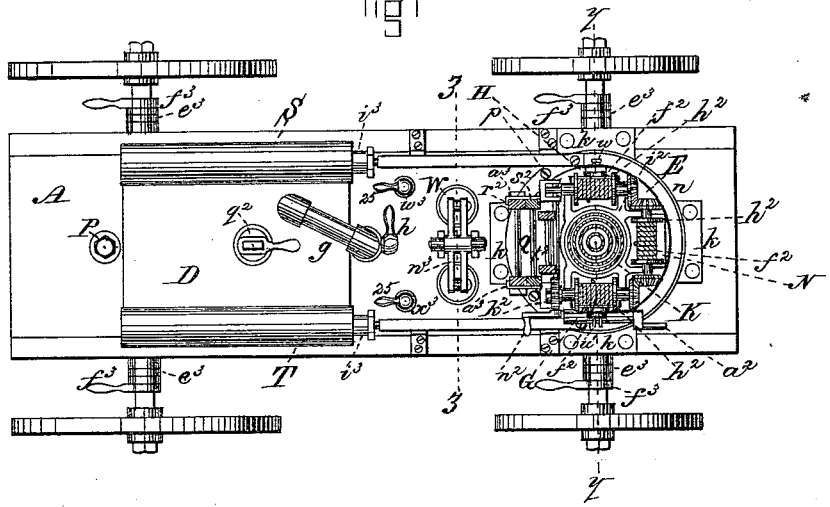
Figure 2:
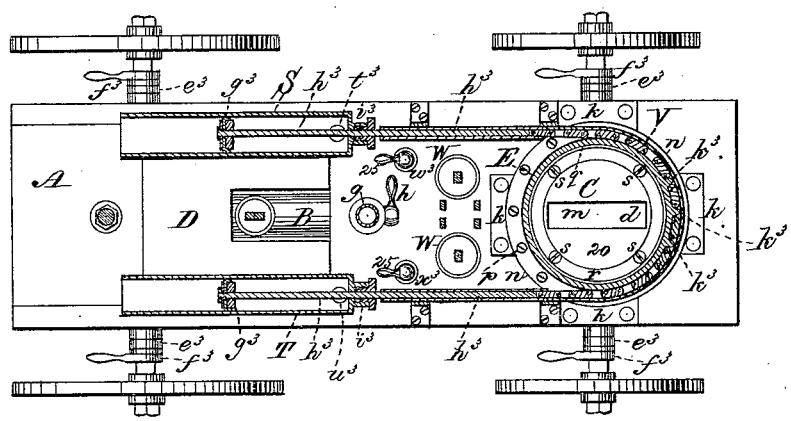
Figure 3:
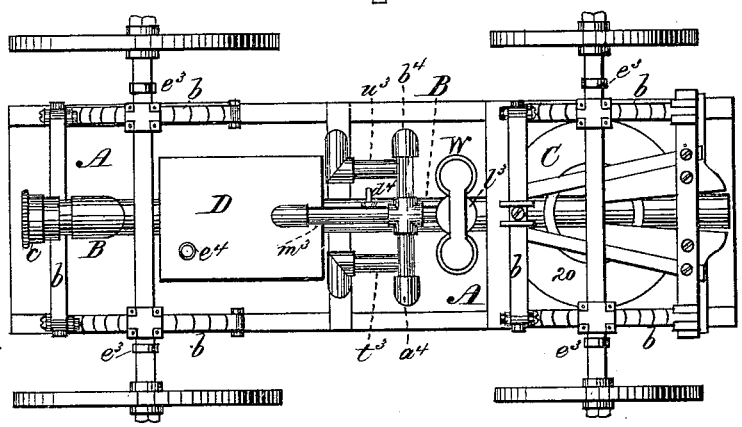
Figure 4:
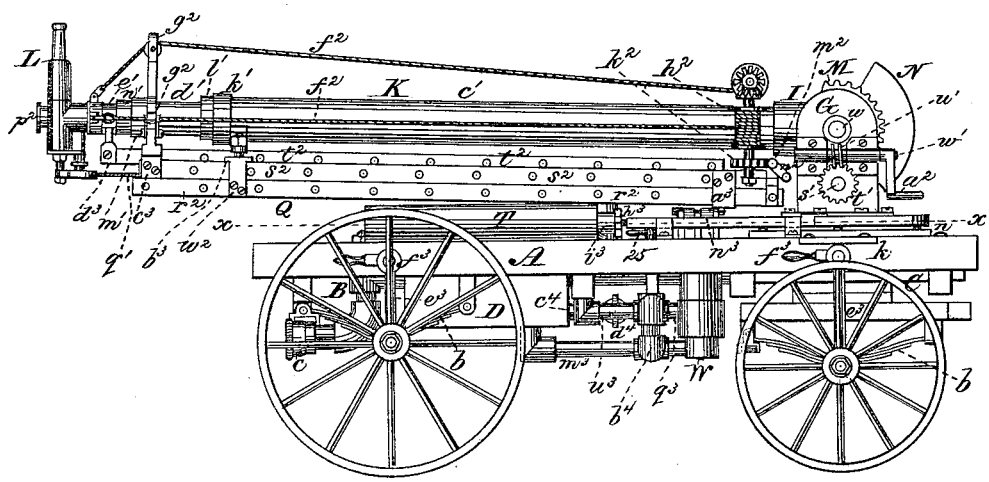
Figure 8:
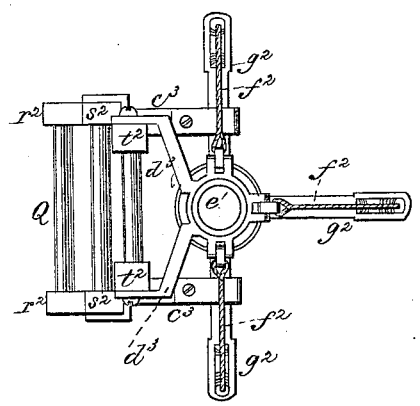
Figure 9:
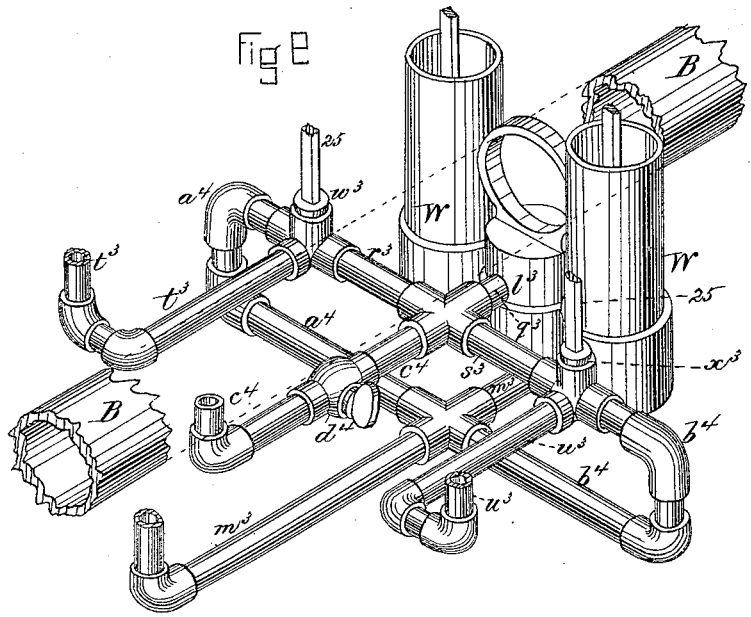

Figure 1 is a plan of my improved water-tower and fire-escape, the extension pipe and ladders being raised to a vertical position and shown in horizontal section. Fig. 2 is a horizontal section of the same on the line $x\ x$ of Fig. 4. Fig. 3 is a plan of the under side of the apparatus. Fig. 4 is a side elevation of the same with the extension pipe and ladders closed together and lowered to a horizontal position upon the truck. Fig. 5 is a vertical section through the center of the apparatus with the extension pipe and ladders raised to a vertical position and partially extended. Fig. 6 is a transverse vertical section on the line $y\ y$ of Fig. 1, drawn to an enlarged scale. Fig. 7 is a transverse vertical section on the line $z\ z$ of Fig. 1, drawn to an enlarged scale. Fig. 8 is a plan of the top of the extension pipe and ladders, with the discharge-pipe removed, drawn to an enlarged scale. Fig. 9 is a perspective view of the main pipe and force-pump and the pipes connected therewith beneath the platform of the apparatus, drawn to an enlarged scale; Figs. 10, 11, 12, 13, and 14, details. Fig. 15 is a plan of the discharge-pipe, the screw-cap on its upper side being removed.

My invention relates to portable water-towers for use in extinguishing fires; and it consists in certain combinations of mechanical devices and details of construction, as will be hereinafter fully described, and specifically pointed out in the claims.

In the said drawings, A represents a four-wheeled truck or platform mounted on springs $b$, the forward portion of the running-gear, to which the pole is applied, being made to swivel, as in ordinary vehicles.

To the under side of the platform A is secured the main pipe B, the rear end of which extends downward and is provided with a screw-coupling, $c$, for attaching thereto the hose from a fire-engine or hydrant or other source from which water may be supplied under pressure. If it should be desired to attach more than one engine or hydrant to the apparatus, a branch or Y coupling is first screwed onto the coupling $c$. The opposite end of the pipe B is screwed into a heavy casting, C, having a straight passage, $d$, which forms a continuation of the pipe B.

D is a closed tank or reservoir, which is secured to the under side of the platform A, and communicates with the main pipe B, which passes directly through it, by means of a small pipe, $g$, through which the tank can be filled with water from the pipe B by turning the stop-cock $h$. The upper portion, 20, of the casting C is of circular form, and is provided with ears or lugs $k$, by means of which it is bolted to the platform A, and within a circular recess in the portion 20 is fitted a hollow turn-table, E, forming a chamber, $l$, Figs. 5 and 6, which communicates through a passage, $m$, with the main water-passage $d$, the turn-table being held in place by a ring, $n$, and screws $p$, as seen in Figs. 5 and 6, the joint between the turn-table and the casting C being rendered perfectly tight by means of a leather packing-ring, $q$, confined in place by a metallic ring, $r$, and screws $s$.

The manner in which the turn-table E is partially rotated in either direction will be described hereinafter.

To the upper surface of the turn-table E are bolted two heavy hollow posts or housings, G H, on the inner side of each of which, at the top, is a circular aperture, $t$, for the reception of a circular flange or trunnion, $u$, formed around the open side of the base-piece I of the telescopic extension-pipe K, which is thus pivoted between the two housings. The flanges $u$ fit the apertures $t$ with a ground joint, to prevent leakage, and the parts are held firmly together by a heavy bolt, $w$, provided at one end with a head and at the other end with a tightening-nut, $a'$, Fig. 6.

Beneath the open bottom of each of the housings G H is an aperture, $b'$, extending through the turn-table E, and communicating with the chamber $l$, thus affording a free passage for the water from the main pipe or passage to the interior of the base-piece I of the extension-pipe K.

The extension-pipe K is composed of three telescopic sections or pipes, $c'$, $d'$, and $e'$, which slide one within the other, the lower section, $c'$, being screwed into the base-piece I. Within the pipe $c'$ is placed a smaller pipe, $f'$, which is also screwed at its lower end into the base-piece I and communicates with the interior thereof, an annular chamber, $g'$, being thus formed between the pipes $c'$ $f'$, which is open at its upper end and closed at its lower end by a solid portion, $h'$. The second section, $d'$, of the pipe K slides within the annular chamber $g'$, and has attached to its lower end an annular flange or ring, $i'$, provided with a suitable packing, whereby a tight piston is formed, which is free to be moved with the section $d'$ up and down within the chamber $g'$.

At the top of the section $c'$ is a cap, $k'$, provided with a stuffing-box, $l'$, through which the second section, $d'$, slides, thus preventing leakage at this point; and at the top of the section $d'$ is a cap, $m'$, provided with a stuffing-box, $n'$, through which passes the third or top section, $e'$, of the extension-pipe, which latter section slides loosely within the pipe $f'$, as seen in Fig. 6, and is provided at its lower end with a flange, $p'$, having a shoulder, 21, which strikes the inside of the cap $m'$, and thus prevents this section from being forced out of the section $d'$, the under side of the flange $p'$ being made tapering to facilitate the entrance of the lower end of the section $e'$ within the pipe $f'$ when retracted or drawn down.

To the upper end of the section $e'$ is secured the discharge-pipe L, which is placed at right angles to the extension-pipe, and is capable of being swung around in a horizontal plane. This discharge-pipe is provided with a suitable valve or cut-off, which is operated by cords $g'$, to enable the stream to be shut off or let on by a person standing on the ground, when desired. I prefer to employ a discharge-pipe constructed in accordance with the United States patent granted to me September 5, 1882, No. 263,731; but a pipe of any other suitable construction may be used instead, if preferred.

On one side of the base-piece I of the extension-pipe K is formed a toothed segment, M, with which engages a gear, $r'$, on the end of a short shaft, $s'$, having its bearings in the housing G, the outer end of this shaft having attached thereto a worm-wheel, $t'$, which is rotated by a worm, $u'$, on a shaft, $w'$, supported in bearings on the outer side of the housing, and provided with a hand-crank, $a^2$, by turning which the extension-pipe can be elevated from the horizontal position which it occupies on the truck when not in use to the vertical position shown in Fig. 5, or inclined at any other desired angle to the platform A that may be required. As soon as the extension-pipe K has been raised to the desired position by turning the crank $a^2$, and water under pressure has been admitted to the main pipe B, it flows up into the extension-pipe until it reaches the discharge-pipe L, previously closed tight, the water at the same time passing through apertures $b^2$, Fig. 6, at the lower end of the section $e'$, into the space between this section and the pipe $f'$, and up over the top thereof, down into the annular chamber $g'$, and through apertures $c^2$ at the bottom of the section $d'$ into the portion of the chamber $g'$ outside the section $d'$, the water thus exerting its full backward pressure upon the piston $i'$, the surface area of which is greater than the cross-sectional area of the closed top of the section $e'$, and consequently the pressure of the water against the upper side of the piston $i'$ is sufficient to hold down the section $d'$ of the extension-pipe K against the upward pressure of the water against the upper closed end of the section $e'$, which latter section is thus first projected upward until arrested by the contact of its stop or flange $p'$ with the cap $m'$. After the upper section $e'$ has been forced out or projected upward, as described, the second section, $d'$, is projected upward or forced out of the lower section, $c'$, carrying with it the section $e'$, in the following manner:

In one side of the base-piece I is placed a two-way cock or valve, $d^2$, Figs. 5 and 12, provided with a suitable handle, by turning which a straight passage, $e^2$, is opened through the plug of the cock from the interior of the base-piece I to the chamber $g'$, when the water will be admitted at full pressure to the chamber $g'$, thus equalizing the water-pressure upon both sides of the piston $i'$, when the pressure of the water upon the upper closed end of the section $e'$ and the under side of the cap $m'$ will be immediately communicated to the section $d'$, causing the latter to be forced up until the piston $i'$ comes into contact with the cap $k'$. The cock $d^2$ can then be turned, if desired, a quarter-way round in one direction, which will cause the water to be shut into the chamber $g'$, so that it cannot escape, when the section $d'$ will be held immovably in its extended position. Should it be desired to lower or retract the section $d'$ within the section $c'$, the cock $d^2$ is turned into another position, which opens a passage through its plug from the chamber $g'$ into the atmosphere, thus allowing the water beneath the piston $i'$ to escape, when the pressure of the water upon the upper side of the piston $i'$, combined with the weight of the two upper sections, $d'$ and $e'$, and parts connected therewith will cause the piston to descend within the chamber $g'$, and thus draw down the sections $d'$ and $e'$.

To the upper end of the section $e'$ are secured a series of ropes or cords, $f^2$, which are led through guides and over pulleys at the outer ends of horizontal arms $g^2$, radiating from a collar secured to the upper end of the section $d'$, these cords being wound upon windlass-drums $h^2$, geared together, as shown in Fig. 1, and supported in a frame, $i^2$, secured to the lower end of the extension-pipe, the shaft of one of these drums being provided with a worm-gear, $k^2$, which is rotated by a worm, $l^2$, Fig. 14, on a shaft, $m^2$, provided with a crank-handle, $n^2$, by turning which all of the windlass-drums can be simultaneously revolved to wind up the ropes $f^2$, which can thus be made to pull down the upper section $e'$ while the stream is playing, if desired, and after this section has been retracted a further draft upon the ropes will also draw down the second section, $d'$. These ropes also serve to stay the upper section $e'$ against any backward pressure or recoil produced by the discharge of the water from the pipe L, and are also used for retracting the sections $e'$ and $d'$ in case there should be no water in the extension-pipe. The shaft $m^2$ is so arranged that the worm $l^2$ can be thrown out of engagement with the gear $k^2$ when it is desired to raise the sections of the extension-pipe, thus allowing the windlass-drums to be rotated freely to allow the ropes to unwind therefrom.

To the base-piece I is secured a counterpoise-weight, N, for balancing the extension-pipe K, when projected out to its full length, said weight consisting of a hollow casting of the form shown, which is adapted to be filled with water, to impart additional weight thereto, through a pipe, 23, Fig. 5, leading to the interior of the base-piece, a suitable two-way cock, 24, being provided for filling and emptying the hollow weight, when desired. The discharge-pipe L is provided on its upper side with a flanged orifice, $x^2$, Fig. 15, provided with a screw-cap, $p^2$, after removing which a length of hose may be attached to the pipe L at this point, which may be carried by a fireman into or onto a burning building, if desired. The main pipe B is provided with a shut-off valve, $q^2$, accessible from the platform A, by means of which the flow of water to the extension-pipe can be regulated to cause the telescopic sections to be raised with more or less rapidity, and if the engine is attached and is pumping water this valve may be entirely closed, to prevent the passage of water to the extension-pipe until the latter is ready to be raised, the usual relief-valve on the engine allowing the latter to work continuously when the valve $q^2$ is closed. The pipe B is provided, near the coupling $c$, with a check-valve, P, which closes automatically by the back-pressure of the water in case of the bursting of the hose, and prevents the escape of the water from the extension-pipe and the dropping down or retraction of the section $e'$, as might otherwise occur.

To the extension-pipe K is secured a ladder, Q, composed of three separate sections or parts, $r^2$ $s^2$ $t^2$, adapted to slide one upon the other, and be carried with the sections of the extension-pipe as the latter are projected or retracted. The lower section, $r^2$, is secured at its bottom to the windlass-frame $i^2$, and near its top to arms $w^2$, attached to the upper end of the lower section, $c'$, of the extension-pipe. The second section, $s^2$, of the ladder slides on the section $r^2$, and is confined in place by clasps $a^3$ at its lower end, and guides $b^3$ on the arms $w^2$, the upper end of this section $s^2$ being connected with the second section, $d'$, of the extension-pipe by arms $c^3$, attached to the arms $g^2$. The top section, $t^2$, of the ladder is attached at its upper end, by means of arms $d^3$, to the upper end of the third section, $e'$, of the extension-pipe, and slides upon the section $s^2$ in suitable guides. At the lower end of the section $t^2$ of the ladder is a catch or retaining device, R, Fig. 5, which, when the top section of the extension-pipe is projected upward, carrying with it the ladder-section $t^2$, catches on one of the top rungs of the ladder-section $s^2$, or over or into a suitable projection or notch, and thus automatically holds up this section $t^2$, and with it the pipe-section $e'$, which is thus prevented from dropping down within the section $d'$ after the discharge-pipe L is opened, and the pressure of the water on the upper end of the section $e'$ consequently reduced. No device of this description is required to hold up the pipe-section $d'$, as by turning the cock $d^2$ the water in the chamber $g'$ can be confined therein to hold this section in its elevated position, as before described. By thus providing the apparatus with a sliding sectional ladder which is adapted to be extended and closed up with the extension-pipe K a convenient means of escape is afforded from a burning building, while it also enables the firemen to readily ascend to the top of the tower, if it should be desired to couple hose to the discharge-pipe L, and carry the same into or upon the burning building from the top of the apparatus, or for any other purpose. Before raising the extension-pipe K the platform A is clamped to the axles to steady it, and the springs $b$ of the running-gear thus relieved from weight by means of two arms, $e^3$, at each axle, pivoted one to each side of the platform, and each provided at the lower end with a square notch or slot, which fits over the axle, after which the upper slotted end of the arm $e^3$ is clamped by a screw-nut, $f^3$, provided with a handle, thus rendering the platform and extension-pipe steady, as required.

I will now describe the manner in which the turn table E is rotated into any desired position to cause the extension-pipe K to be turned about its longitudinal axis when elevated in a vertical position, or, if inclined at an angle, to be swung over from one side of the platform to the other when there is no water under pressure in the pipe B.

S T are two cylinders secured to the upper surface of the platform, on opposite sides thereof, immediately over the reservoir D. These cylinders, which are parallel with each other, are provided with pistons $g^3$, the piston-rods $h^3$ of which pass through stuffing-boxes $i^3$, and to these rods $h^3$ are secured the opposite ends of a chain, V, which passes around the periphery of the turn-table E, and is connected therewith by means of spurs or projections $k^3$, Fig. 2, thereon, with which the links of the chain engage. Beneath the platform A is secured an ordinary double-acting force-pump, W, provided with an air-chamber, $l^3$, and appropriate valves, a suction-pipe, $m^3$, leading into the bottom of the reservoir D, and a brake-lever, $n^3$, being placed above the platform A, and having a removable extension piece or handle, $p^3$, Fig. 7.

$q^3$ is the delivery-pipe of the pump, which is connected by branch pipes $r^3$ $s^3$ with pipes $t^3$ $u^3$, leading to the front ends of the cylinders S T, and at the junctions of the pipes $r^3$ $s^3$ with the pipes $t^3$ $u^3$ are placed the two-way cocks $w^3$ $x^3$, the handles 25 of which are placed in an accessible position above the platform A. The T-couplings to which the cocks $w^3$ $x^3$ are applied are also connected with return-pipes $a^4$ $b^4$, leading to and connected with the suction-pipe $m^3$. When it is desired to rotate the turn-table E in one direction, the cock $w^3$ is opened and the cock $x^3$ closed, when, as the pump is operated, the water drawn from the tank D will be forced through the pipes $r^3$ $t^3$ into the cylinder S in front of its piston, forcing the latter back, the movement of the piston being communicated through the rod $h^3$ and chain V to the turn-table E, which is thus turned as desired, and when it is desired to rotate the turn-table in the opposite direction the cock $w^3$ is closed and the cock $x^3$ opened, when the water from the pump will be forced through the pipes $s^3$ $u^3$ into the cylinder T in front of its piston, the water in the other cylinder, S, being forced back by the counter movement of its piston and returned through the pipes $t^3$ $a^4$ to the suction-pipe $m^3$, a suitable passage in the cock $w^3$ causing the water to take this direction. The water in the cylinder T is returned to the suction-pipe $m^3$ in a similar manner when the cock $w^3$ is opened and the cock $x^3$ closed.

$c^4$ is a pipe leading from the delivery-pipe $q^3$ at its junction with the branch pipes $r^3$ $s^3$ into the main pipe B, and provided with a stop-cock or valve, $d^4$, and when the main water-passage is closed tightly at both ends and the cock $d^4$ is opened water can be forced by the pump W from the reservoir D into the pipe B, and thence to the extension-pipe K, for the purpose of projecting or forcing out its sections in case there should be no street-hydrant at hand and it should be desired to elevate the extension-pipe before the arrival of an engine, the reservoir D being constructed to hold more than enough water to fill the extension-pipe K full when all of its sections are projected to their full extent.

If it should be desired to lower the extension-pipe K by allowing the water therein to flow back into the reservoir D, the cock $h$ in pipe $g$ is opened, when the water will pass directly into the reservoir, which is provided with an overflow-pipe, $e^t$, so that if the reservoir D should be partially full when the cock $h$ is opened and there should be more than sufficient water in the extension-pipe to fill the reservoir the surplus will run out through the overflow-pipe $e^t$, and thus allow the sections of the extension-pipe to be retracted to their lowest positions.

When the main pipe B contains water under sufficient pressure, the turn-table E can be operated without the employment of the force-pump W by simply opening the cock $d^4$ in the pipe $c^4$, when the water under pressure will pass from the main pipe B through the pipe $c^4$ to the branch pipes $r^3$ $s^3$, and through one or the other of the cocks $w^3$ or $x^3$ and pipe $t^3$ or $u^3$ to the cylinder S or T, as desired, in which case the other cock, $w^3$ or $x^3$, as the case may be, is turned into such position as to allow the water to pass from the cylinder being emptied into the pipe $a^4$ or $b^4$, and thence by the suction-pipe $m^3$ to the reservoir D, and out therefrom by the overflow-pipe, if the reservoir should be full.

From the foregoing it will be seen that by the employment of the hydraulic apparatus described the tower, with its ladder, can be readily operated and controlled by one person alone, thus avoiding loss of time at a critical moment, when any delay might result in a great destruction of property.

What I claim as my invention, and desire to secure by Letters Patent, is—

1. In a water-tower, a telescopic extension-pipe, K, having an open annular chamber, $g'$, within its lower section, and a second section, $d'$, provided with a piston, $i'$, sliding within said chamber, and having a surface area greater than the cross-sectional area of the upper section of the extension-pipe, whereby the backward pressure of the water on the piston, combined with the weight of the sections connected therewith, is caused to hold down the section $d'$ against its tendency to be projected outward by the pressure of the water against the closed top of the upper section of the pipe, in combination with means for admitting water into the chamber $g'$ beneath the piston, to equalize the pressure upon opposite sides thereof, and thereby cause the section $d'$ to be projected outward by the pressure of the water upon the cap $m'$ and the outer closed end of the upper section, $e'$, substantially as set forth.

2. The combination, with the lower section, $c'$, having an open annular chamber, $g'$, of the piston $i'$ and the section $d'$, secured thereto, and provided with apertures $c^2$, for the purpose of admitting the water to the entire upper surface area of the piston $i'$, substantially as set forth.

3. The combination, with the pipe $f'$ and sections $d'$ $c'$, of the section $e'$, provided with a flange, $p'$, and apertures $b^2$, for the passage of the water into the space between the pipe $f'$ and the section $e'$, substantially as and for the purpose described.

4. In a water-tower, the combination, with the truck or platform A and a main water pipe or passage adapted to receive water under pressure and conduct it to the base of the extension-pipe K, of a hollow turn-table, E, communicating with the said main water-passage and provided with hollow posts or housings G H, through which the water is conducted to the base-piece of the extension-pipe, pivoted on trunnions between said housings, all constructed to operate substantially as set forth.

5. In a water-tower, the combination, with the extension-pipe K, pivoted between the posts G H, and means, substantially as described, for elevating the pipe from its horizontal position on the truck or platform, of the hollow counterpoise-weight N, attached to the base-piece I of the lower section, and adapted to contain water, and provided with means for filling and emptying the same, substantially as described.

6. In a water-tower, the combination, with a truck or platform, A, of the turn-table E, having a sectional extension-pipe mounted thereon, and the cylinders S T, provided with pistons $g^3$, connected with said turn-table, and operated by hydraulic pressure to turn the said table, substantially as set forth.

7. In a water-tower, the combination, with the truck or platform A, of the turn-table E, the cylinders S T, with their pistons $g^3$, rods $h^3$, and the chain V, connected therewith and with the turn-table, the main pipe B, the pipe $c^4$, with its cock $d^4$, and the pipes $r^3$ $s^3$ $t^3$ $w^3$ $a^4$ $b^4$ $m^3$, and the two-way cocks $w^3$ $x^3$, whereby the turn-table can be operated by the pressure of the water in the main pipe B, substantially as described.

8. In a water-tower, the combination, with the truck or platform A, of the turn-table E, with its extension-pipe K, the cylinders S T, with their pistons $g^3$, rods $h^3$, and the chain V, connected therewith and with the turn-table, the force-pump W, the reservoir D, and the pipes $m^3$ $q^3$ $r^3$ $s^3$ $t^3$ $w^3$, with their cocks $w^3$ $x^3$, all constructed to operate substantially in the manner and for the purpose described.

9. In a water-tower, the combination of the main pipe B, the reservoir D, the force-pump W, with its suction and delivery pipes, and the pipe $c^4$, leading from the pump to the pipe B, and provided with a valve or cock, $d^4$, whereby water can be drawn by the pump from the reservoir and forced into the pipe B, to project or raise the sections of the extension-pipe K, substantially as set forth.

10. In a water-tower, the combination, with the reservoir D, provided with an overflow-pipe, $e^4$, and the main pipe B, of the pipe $g$, provided with a valve or cock, $h$, for conducting water directly from the pipe B to the reservoir, substantially as and for the purpose described.

Witness my hand this 18th day of July, A. D. 1883.

LORING D. SHAW.

In presence of—
P. E. TESCHEMACHER,
W. J. CAMBRIDGE.